US008103850B2

(12) United States Patent
Nair et al.

(10) Patent No.: US 8,103,850 B2
(45) Date of Patent: Jan. 24, 2012

(54) DYNAMIC TRANSLATION IN THE PRESENCE OF INTERMIXED CODE AND DATA

(75) Inventors: Ravi Nair, Briarcliff Manor, NY (US); Kevin A. Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/435,515

(22) Filed: May 5, 2009

(65) Prior Publication Data

US 2010/0287355 A1 Nov. 11, 2010

(51) Int. Cl.
*G06F 9/26* (2006.01)
(52) U.S. Cl. ........ 711/205; 711/203; 711/206; 711/207; 711/208; 717/136; 717/134
(58) Field of Classification Search .................. 711/205, 711/203, 206, 207, 208; 717/136, 134
See application file for complete search history.

(56) References Cited

U.S. PATENT DOCUMENTS

| | | |
|---|---|---|
| 5,488,714 A | 1/1996 | Skidmore |
| 5,799,165 A | 8/1998 | Favor et al. |
| 5,841,947 A | 11/1998 | Nordin |
| 5,875,318 A | 2/1999 | Langford |
| 5,946,673 A | 8/1999 | Francone et al. |
| 5,946,674 A | 8/1999 | Nordin et al. |
| 6,009,516 A | 12/1999 | Steiss et al. |
| 6,093,213 A | 7/2000 | Favor et al. |
| 6,098,059 A | 8/2000 | Nordin |
| 6,128,607 A | 10/2000 | Nordin et al. |
| 6,141,742 A | 10/2000 | Favor |
| 6,151,618 A | 11/2000 | Wahbe et al. |
| 6,195,744 B1 | 2/2001 | Favor et al. |
| 6,282,707 B1 | 8/2001 | Isozaki |
| 6,453,278 B1 | 9/2002 | Favor et al. |
| 6,457,171 B1 | 9/2002 | Mann et al. |
| 6,460,178 B1 | 10/2002 | Chan et al. |
| 6,481,008 B1 | 11/2002 | Chaiken et al. |
| 6,493,686 B1 | 12/2002 | Francone et al. |
| 6,516,295 B1 | 2/2003 | Mann et al. |
| 6,529,862 B1 | 3/2003 | Mann et al. |
| 6,594,734 B1 | 7/2003 | Kyker et al. |
| 6,609,248 B1 | 8/2003 | Srivastava et al. |
| 6,662,356 B1 | 12/2003 | Edwards et al. |
| 6,802,056 B1 | 10/2004 | Chaiken et al. |
| 7,007,005 B2 | 2/2006 | Rautenback et al. |
| 7,058,929 B2 | 6/2006 | Charnell et al. |
| 7,096,403 B2 | 8/2006 | Seki |
| 7,107,580 B2 | 9/2006 | Zemach et al. |
| 7,197,748 B2 | 3/2007 | Chaiken et al. |
| 2003/0093775 A1 | 5/2003 | Hilton |
| 2004/0015675 A1 | 1/2004 | Kyker et al. |

(Continued)

*Primary Examiner* — Alexander Sofocleous
*Assistant Examiner* — Han Yang
(74) *Attorney, Agent, or Firm* — Cantor Colburn LLP; William J. Stock

(57) ABSTRACT

A system for translating software in a first format into a second format includes a memory containing the software in the first format and an emulator coupled to the memory configured to translate the software from the first format to the second format. The system also includes a host engine coupled to the emulator and configured to perform instructions in the second format. The emulator is configured to determine whether a store command in the first format stores information to a memory page that includes instructions and to convert the store instruction to a special store instruction in the event that the target of the store instruction does not contain an instruction.

14 Claims, 3 Drawing Sheets

U.S. PATENT DOCUMENTS

2004/0015832 A1 1/2004 Stapp et al.
2004/0133884 A1* 7/2004 Zemach et al. ............... 717/138
2005/0015756 A1 1/2005 Brown et al.
2006/0165119 A1 7/2006 Dugan et al.
2009/0300612 A1* 12/2009 Devine et al. ..................... 718/1
2009/0300645 A1* 12/2009 Devine et al. ................. 718/107

* cited by examiner

DYNAMIC TRANSLATION IN THE PRESENCE OF INTERMIXED CODE AND DATA

BACKGROUND

The present invention relates to dynamic code translation, and more specifically, to translating code in the presence of intermixed code and data.

In computing, binary translation is the emulation of one instruction set by another through translation of code. Sequences of instructions are translated from the source to the target instruction set. For example, a program may be written in a high-level programming language and translated into machine code for execution by a particular machine. The conversion process may be done, for example, in a compiler.

Static binary translation is a type of translation where an entire executable file is translated into an executable of the target architecture. This is very difficult to do correctly because not all the code can be discovered by the translator. For example, some parts of the executable may be reachable only through indirect branches whose value is only known at run-time.

Alternatively, dynamic translation looks at a short sequence of code, typically on the order of a single basic block, translates it and caches the resulting sequence. Code is only translated as it is discovered and when possible, branch instructions are made to point to previously translated code.

Dynamic binary translation differs from simple emulation in that it eliminates the emulator's main read-decode-execute loop (a major performance bottleneck). Of course, elimination of this loop may cause large overhead during translation time. This overhead is hopefully amortized as translated code sequences are executed multiple times.

In binary or dynamic translation of software code (particularly, machine code), situations may arise where the original code modifies itself. In such situations, any translations that have been made must be invalidated before the code is modified and regenerated if necessary. To detect such self-modification, it is necessary to trap all writes that access code locations. This can be done fairly easily using existing page table structures if code regions are completely separated from data regions as is required in some of the newer coding conventions.

However, in older code, written when memory was scarce, program code (or instructions) may have been intermixed with data that it may be operating on, within the same page or even in the same cache line. These cases result in false traps (i.e., traps that need not occur because the stores target the data area rather than the adjacent code areas that have been translated). Unless all locations that contain code are listed in some data structure at low granularity it is possible that innocuous stores (i.e., stores that do not touch code locations) will still cause a trap and a needless flush of unaffected translations. Yet, a listing at a byte or halfword granularity is impractical because of the potential size of the table involved, and hence the granularity of the listing is made larger, often as large as a page (4096 bytes). The problem with this larger granularity is a loss of accuracy in identifying whether the location being written into is indeed a code location or not.

Past solutions to this problem involve trapping whenever a region of memory that may contain code is written into and either invalidating all translations that involve code in that region, or adding prolog code to those translations to check whether the code has indeed been modified. The principal drawback to these solutions is the overhead involved and consequently the loss of efficiency in the performance of emulation or dynamic optimization. In the first case, trapping on a write and the process of invalidating and regenerating translations causes overhead which becomes prohibitive when there are a large number of writes to such regions, while in the second case the overhead of performing the comparison on every execution of the translated segment becomes high even when the writes are relatively infrequent.

SUMMARY

According to one embodiment of the present invention, system for translating software in a first format into a second format is provided. The system includes a memory containing the software in the first format and an emulator coupled to the memory configured to translate the software from the first format to the second format. The system also includes a host engine coupled to the emulator and configured to perform instructions in the second format. The emulator is configured to determine whether a store command in the first format stores information to a memory page that includes instructions and to convert the store instruction to a special store instruction in the event that the target of the store instruction does not contain an instruction.

Another embodiment of the present invention is directed to a method for translating code from a first format to a second format that includes receiving a section of code to be translated from the first format to the second format; determining that a particular instruction is a store instruction; accessing a translation lookaside buffer to determine that the address of the store is present; determining that the store instruction accesses a memory page that includes instructions; generating a code alias trap; accessing a translation cross-reference table and determining that the address contains data and not instructions; and updating the translation for the store instruction to a special store instruction.

Another embodiment of the present invention is directed to a system for translating software in a first format into a second format. The system of this embodiment includes a memory containing the software in the first format, an emulator coupled to the memory configured to translate the software from the first format to the second format and a host engine coupled to the emulator and configured to perform instructions in the second format. The emulator is configured to convert store commands in the first format to a special store instruction in the second format and maintaining a table of the stores for reference in the event that one or more of the store commands in the first format stored to a memory location that included instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present invention may solve some or all of the problems associated with prior art by statically analyzing the code to identify where writes to code regions occur and determining that the writes do not, in fact, modify code.

If the write did modify code, the code would have to be retranslated. If the write does not modify code, the write need not be trapped. This may be accomplished by creating two different instructions for writing, a normal store (ST) that traps whenever a region of memory containing code is to be modified, and a special store (STNT) that does not trap for previously translated code and hence can be used for any writes to regions that can be proved to be innocuous. Both the ST and STNT commands may be implemented at any store granularity, e.g., STB and STBNT for bytes and STH and STHNT for half words and so on.

One advantage that may be realized according to the present invention is a reduction in overhead due to both the trap and the handling of the trap because most writes into code regions are indeed innocuous.

Figure 1:
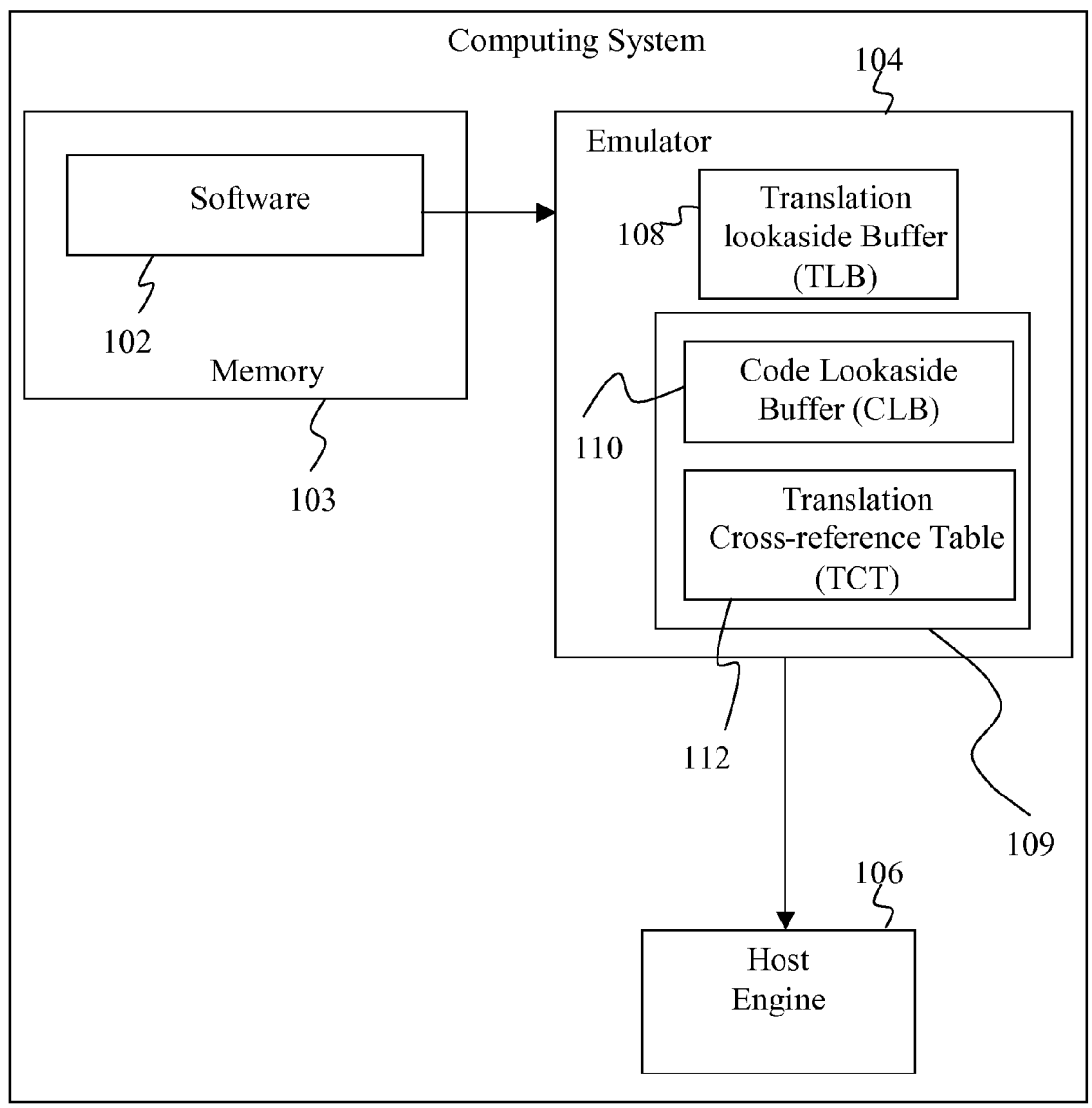
FIG. 1 shows a system according to one embodiment of the present invention.

FIG. 1 shows a block diagram of a computing system 100 according to one embodiment of the present invention. The computing system 100 includes software 102. The software 100 may be stored in memory 103. The memory may be any type of now available or later developed computer readable memory. The software 102 may be any type of software written in any programming language.

The computing system 100 may also include an emulator 104 and a host engine 106. In general, the emulator 104 duplicates (provides an emulation of) the functions of one system while using a second, different system, so that the second system behaves like (and appears to be) the first system. Here, the emulator 104 allows for software written for any type of operating system to be translated in a manner such that the host engine 106 may run it. For example, if the software 102 was written for one operating system, the emulator 104 may translate the software into a form that may be run by the host engine 106 even if the host engine 106 is operating under a different operating system that the software 102 was written for. In other words, the emulator 104 will cause the host engine 106 to behave in the manner required by the software 102 even though the host engine 106 may be configured to operate in a different manner. Advantageously, the emulator 104 allows for older software programs to be run on new machines without the older software programs being rewritten.

The host engine 106 referred to herein may be any actual or virtual machine state that provides software services for processes or programs while a computer is running. It may pertain to the operating system itself, or the software that runs beneath it. Host activities may include loading and linking of the classes needed to execute a program, optional machine code generation and dynamic optimization of the program, and actual program execution.

As discussed above, older software programs may, from time to time, have mixed "code" and "data" on the same page. Some of these older software programs may also have allowed for code to change other code during execution. Today, however, a typical host engine 106 may not allow for either of these possibilities. That is, current host engines typically do not allow for data stores (writes) to be performed on any page that includes code or allow for stores that store into a location that is known or believed to be code. As such, current emulators may include methods, called traps, that detect when a translation created by the emulator results in a store command that writes to a page that contains code.

Embodiments of the present invention may determine that even though the emulator 104 has created a store command that writes to a page having both code and data stored therein, the store command does not, in fact, write to a location containing code. In such instances, embodiments of the present invention may alter the translation for a specific line of code such that the store command is replaced with one of the special store commands described above. These special store commands allow the emulator 104 to bypass a trap for any address that exists in previously translated code.

The emulator 104 includes a translation lookaside buffer (TLB) 108, a code table 109 that includes a code lookaside buffer 110 and a translation cross-reference table 112. These portions (and possibly others) of the emulator 104 are utilized to translate code from one format to another according to embodiments of the present invention.

In general, the translation lookaside buffer (TLB) 108 is a CPU cache that is used by memory management hardware to improve the speed of virtual address translation. If the requested address is present in the TLB 108, the physical address can be used to access memory very quickly. If the requested address is not in the TLB 108, the translation proceeds using a page table (not shown), which is slower to access.

The code table 109 may include a list of addresses of regions containing translated code. The size of "regions" may be implementation-dependent and may, for example, utilize a page size (4096B) or cache line size (64B to 256B).

As discussed above, newer binary formats separate code and data on page boundaries and, thus, use existing page table structures. However, old binaries intermix code and data on arbitrary boundaries and arbitrary granularity. This mixing may lead to more frequent faulting and code regeneration due to trapping routines determining that a store command is writing to region that may include code. If cache line size regions are used, smaller granularity may be achieved at the cost of greater memory requirements to track the addresses of portions of code that have been translated. To increase speed, a smaller active portion of the code table 109 may be kept in hardware in a code lookaside buffer 110 which operates similarly to a TLB. In one embodiment, the code lookaside buffer 110 operates at a page level.

In operation, the code table 109 (as well as the CLB 110) may include a normal page table entry that indicates whether or not a particular page contains code. The translation cross-reference table, TCT 112, is a table, which when indexed by a byte address, points to a list of entries corresponding to locations of translations in the code cache. Each translation pointed to by this list translates a distinct source block that includes the indexed byte.

In general, a first translation according to an embodiment of the present invention may occur as follows. When a store command is being translated, the emulator 104 as in the prior art generates an address for the store. This address is compared against the addresses stored in the TLB 108 and the "code addresses" stored in the code table 109 (typically first by checking the CLB 110). Any address that is in a region in the CLB 109 that indicates code is present is trapped. As discussed above, these trapped translations may be altered according to embodiments of the present invention to avoid such a trap if it is known that the particular location does not, in fact, include code. One way in which it may be determined that a particular location does not include code may be to determine that no branch (BRC) instructions point to the particular location. Thus, considering, for example, each BRC instruction in a compiled unit of code may give the locations that are branched to. The other locations may then be considered "data." As such, any store that points to these memory locations may be written to without breaking the current programming (linkage) convention that does not allow code to modify code regions. Consider, for example, the annotated pseudo-code shown below in Table 1 below.

TABLE 1

| 0000 | BRAS R1, 4 | Addressability established: R1<- 0004, i.e. address of next instruction |
|---|---|---|
| 0004 | Code Begins | |
| ... | | |
| 0020 | ST  R5, 0x35(R1) | Store the value in R5 into location (R1) + 35, i.e. location 39 |
| 0030 | BRC  0xff, 0x10 | Always branch 0 bytes from here, i.e. location 0040 |
| 0034 | Data locations | No branches point to these locations, hence they are unreachable by code |
| ... | | |
| 003F | Data locations | |
| 0040 | Code Resumes here | |
| ... | | No branches point to locations 0030-003F |
| 0060 | End of code | |

The store instruction in the translation of the above code segment corresponding to the ST in instruction 0200 may be converted to a no-trap store. In particular, because the store instruction is for location 0039 and the BRC instruction at line 0030 always branches to line 0040, the locations between line 0030 and 0040 are always data. As such, data can be stored there without the possibility of that code being overwritten.

The example given above is but one way in which embodiments of the present invention may operate. In one embodiment, for any stores where the address is known at compile time and addressing code is available to the compiler, the stores may be speculatively set not to trap (SSNT) whenever that destination is known never to have been translated. This may include when the code is no longer in the code cache at compile time. However, in practice, if an address has previously been translated it is likely it will be translated again and this may provide sufficient evidence in most cases to make it a bad risk to speculate. The location of such a store in the code cache is remembered in the code lookaside buffer 110. If a subsequent request to translate at the address that is the destination of this store occurs, then the store instruction (and any others to this address that may have been created) is patched to the trapping form before the request to translate is completed. In practice, it may be rare that this kind of speculation would need to be recovered from, but having this capability makes it possible to use the higher performance non-trapping version of the store even in situations where it cannot be fully proven that there is no branch in the program that can reach the location stored to. In general, due to the presence of indirect branches with complicated data dependencies that may not be evaluated at compile time, it may be common that it is not possible to prove that a given location is unreachable and even where it is possible, it may be so expensive to prove it that speculation driven by heuristics is a much more practical and effective solution. It is common for such runtimes to have this kind of book-keeping to recover from speculative operations. Similarly, if the compiler translates a store that it knows will trap, if executed, because it can prove that it writes to code, then it may instead lay down the code to flush the code cache and perform the store without going through the expensive trap mechanism. This would tend to be a rare event as there is normally very little self-modifying code that is ever executed.

Figure 2:
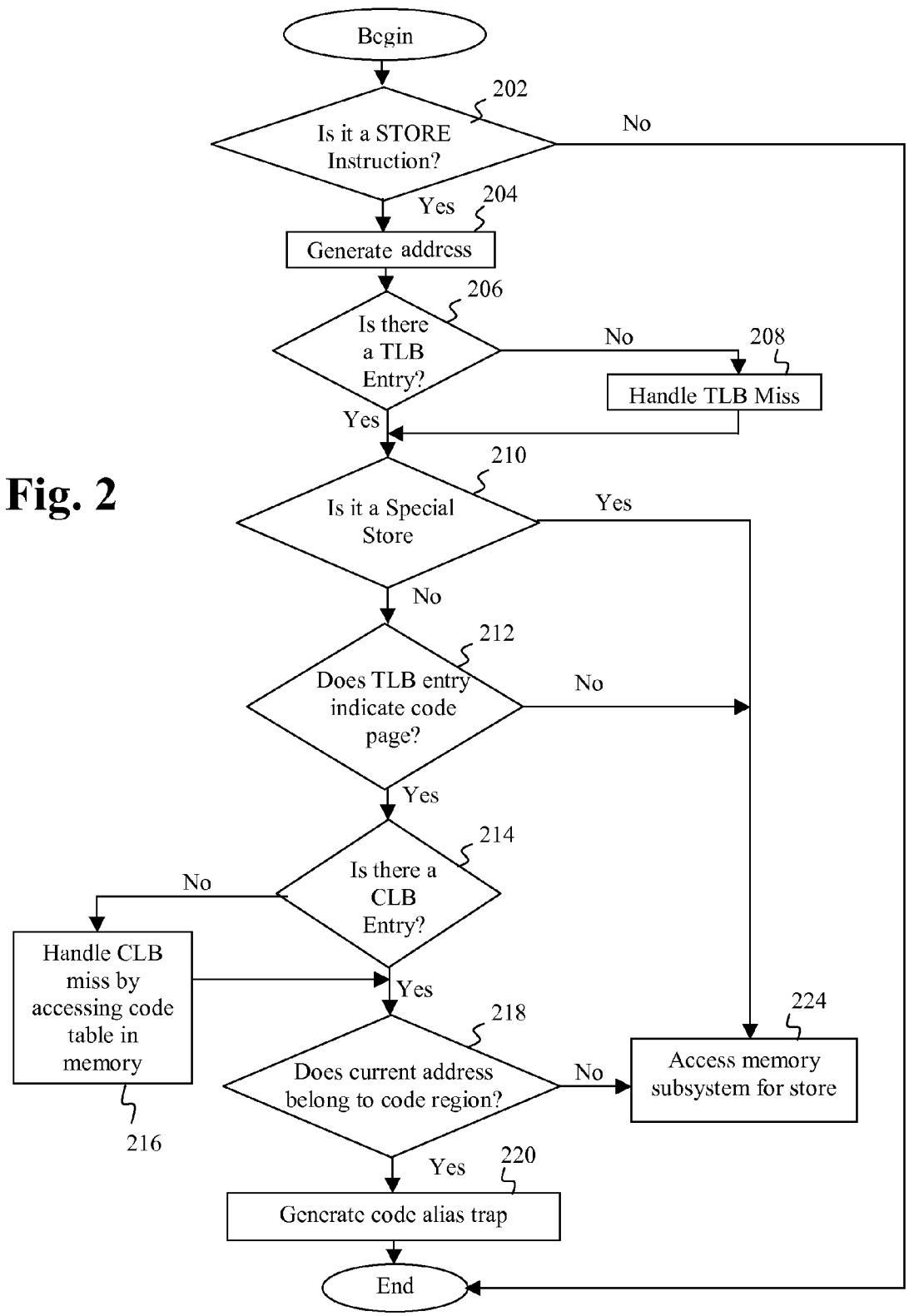
FIG. 2 shows a method of trapping code that may write to memory location containing code according to one embodiment of the present invention.

FIG. 2 is a flow chart showing one method according to an embodiment of the present invention. In particular, the method shown in FIG. 2 may be used according to embodiments of the present invention to determine if a specific translation should be trapped. As discussed above, a translation may be trapped if it is possible that the translation may cause a write to a region of memory that may contain code.

At a block 202 it is determined if the current instruction for translation is a store instruction. If the current instruction is not a store instruction the process ends because there is no chance that writing data to a code region in the translation may occur. In the event that the instruction is a store instruction an address for the store command is generated at a block 204. The translation may be generated in any manner known in the prior art. For example, the store command may include a base register plus an offset value that, combined, represent the address where the information is to be stored.

At a block 206 it is determined whether there is a TLB entry for the particular address. If not, at a block 208 a TLB miss handling routine may be implemented. A TLB miss occurs if there is no virtual-to-real translation for a particular address. In this case, the memory access is invalid and the operating system must take some action to deal with the problem. When physical memory is not full, this is quite simple. The page merely needs to be written into physical memory, a modification to the entry in the page table updated to say that it the new page is present in physical memory, and a mapping is written into the TLB and the instruction restarted. However, when physical memory is full and there are no free frames available, pages with physical memory may need to be swapped with the page that needs to be written to physical memory. Of course many other methods may be available for handling TLB misses and may be well known to those of ordinary skill in the art.

At a block 210 it is determined whether the store instruction is a special store instruction (e.g. STNT), as that term has been used herein. If the instruction is a special store instruction, as discussed above, it is known that any existing translation for the current block of code is correct and does not allow for the store to write into a code containing address. Thus, if it is a special store instruction at a block 224 the memory subsystem is accessed and the store is completed. If the instruction is not a special store instruction it needs to be determined whether the TLB includes, at a block 212, an indication that the page for this store has code on that page. If there is no code on that page then the store may proceed in a normal manner as indicated at block 224.

Otherwise, at a block 214, it is determined whether there is a code lookaside buffer entry for the particular page. If there is not a code lookaside buffer entry, at a block 216, the CLB miss is handled by accessing the code table which is in memory. Using the contents of the CLB entry at a block 218 it is determined whether the current address belongs to a code region. If it does not, the store may proceed in the normal manner as indicated at a block 214. Otherwise, if the address belongs to a code region then a code alias trap is generated at block 220.

Figure 3:
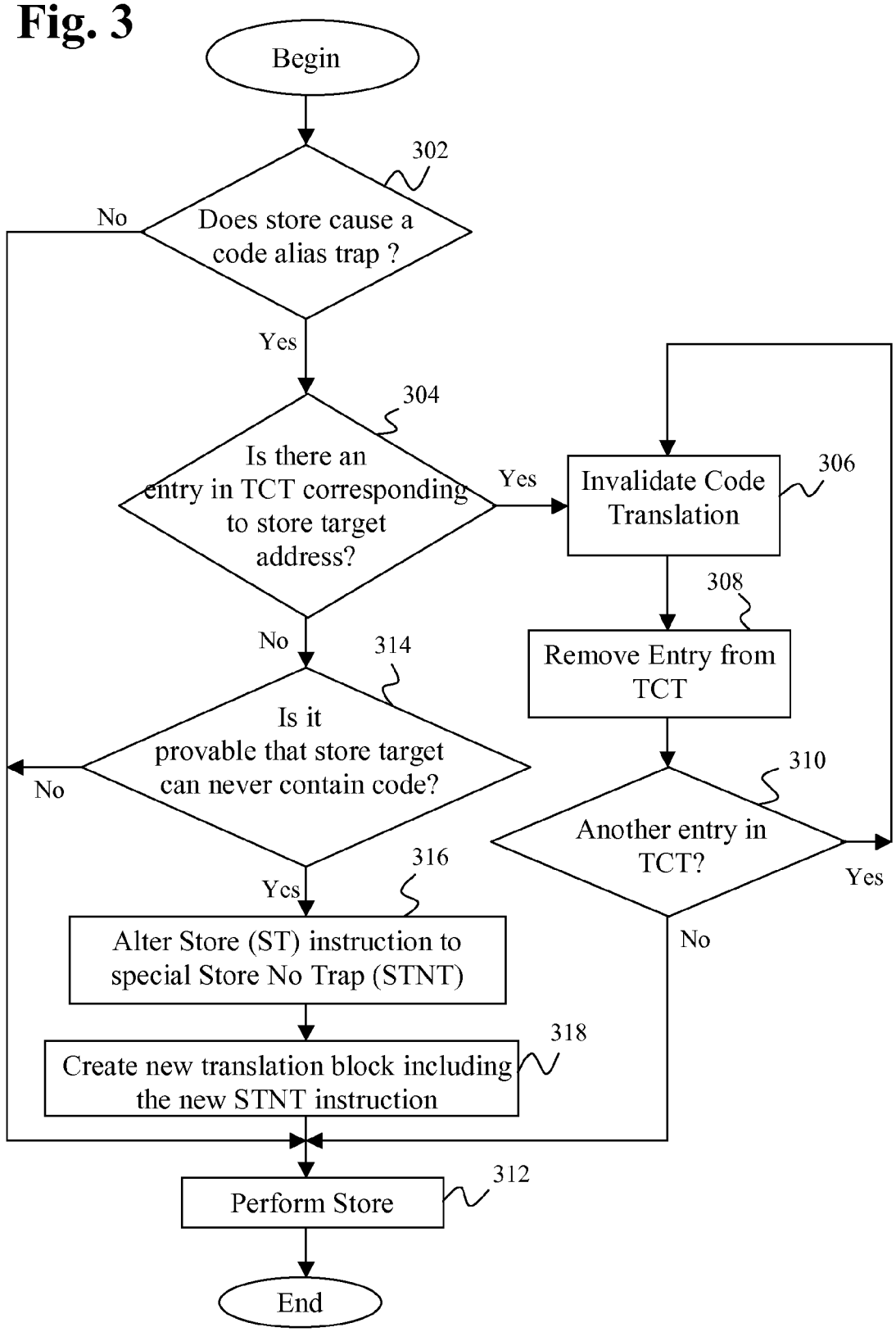
FIG. 3 shows a method of altering a store command to a special store command according to one embodiment of the present invention.

FIG. 3 shows an example of a method according to another embodiment of the present invention. At a block 302, it is determined whether a code alias trap has occurred. If such a trap has not occurred the store is completed in block 312 and the process ends.

At a block 304 it is determined whether or not the particular location that the store instruction is modifying actually contains code. This may be accomplished, for example, by looking at translation cross-reference table TCT 112 (FIG. 1). If an entry exists that corresponds to any of the locations modified by the store instruction, it implies that the location contained an instruction word, and that instruction word was part of a block that has been previously translated. Hence in block 306 this translation which is stored in the code cache is invalidated, and the entry corresponding to the translation is removed from the code table in memory, and from the CLB if it exists. As indicated in block 306, the entry in the TCT 112 is also invalidated.

Since there may be multiple translated blocks that contain the locations modified by the store, the TCT 112 is checked again in block 308 and the process of eliminating the corresponding translations is continued through blocks 306, 308, and 310, until all such blocks are eliminated. At this point the store can be performed as in block 312 and the process ends.

If, on the other hand, the block 304 determines from examining the TCT 112 that there are no translations in the code cache that are affected by the store, then there is a possibility that these locations do not contain code. It is often possible, as demonstrated by the example in Table 1, to prove decisively that these locations cannot contain code even in the future and to prove decisively that the specific store instruction will always modify the same locations. The attempt at such a proof is depicted in block 314. When this is possible the store is converted as in block 316 to a special store of the STNT type that will not trap in future. This change of the ST instruction to the STNT type is remembered by the emulator by including a translation containing that instruction in the code cache as shown in block 318. The store is performed in block 312 and the process ends.

If the above mentioned conditions cannot be proved decisively, the ST instruction is performed as in block 312 without changing its form, and the process ends.

Advantageously, allowing such special store will result in fewer traps being created. Reducing the number of traps may thus reduce processing and overhead related to the new translations that heretofore have been required. That is, in the prior art the ability to alter the store command was not possible and, as shown in FIG. 3, the steps in blocks 306, 308, and 310 were required every time a trap occurred. In the present invention the trap only occurs once until the store command is changed to a special store command that does not result in a code alias trap and therefore none of the blocks in FIG. 3, except block 312, ever need to be done for that particular translation again.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for translating software in a first format into a second format, the system comprising:
   a memory containing the software in the first format;
   an emulator coupled to the memory configured to translate the software from the first format to the second format; and
   a host engine coupled to the emulator and configured to perform instructions in the second format;
   wherein the emulator is configured to determine whether a store command in the first format stores information to a memory page that includes instructions and to convert the store instruction to a special store instruction in the event that the target of the store instruction does not contain an instruction.

2. The system of claim 1, further comprising:
   a translation lookaside buffer containing translations from virtual memory addresses to physical memory addresses;
   a code table listing addresses of regions in the memory containing code previously translated from the first format to the second format.

3. The system of claim 2, wherein the code table further comprises:
   code lookaside buffer containing translations from the first format to the second; and
   a translation cross-reference table containing entries pointing to translated code that may exist for any location that is a target of a store instruction.

4. The system of claim 3, wherein the emulator is configured to determine, for each store command, whether the target address of the translation is located on a page that contains code.

5. The system of claim 4, wherein the emulator is further configured to access the translation cross-reference table in the event that the target address of the translation is located on a page that contains code and to determine if the target address includes an instruction.

6. A method for translating code from a first format to a second format, the method comprising:
- receiving a section of code to be translated from the first format to the second format;
- determining that a particular instruction is a store instruction;
- accessing a translation lookaside buffer to determine that the address of the store is present;
- determining that the store instruction accesses a memory page that includes instructions;
- generating a code alias trap;
- accessing a translation cross-reference table and determining that the address contains data and not instructions; and
- updating the translation for the store instruction to a special store instruction.

7. The method of claim 6, further comprising:
- invalidating the translation for the store instruction in a code table.

8. The method of claim 6, further comprising:
- determining that the store instruction is a special store instruction; and
- executing the special store instruction without generating a code trap.

9. The method of claim 8, wherein the special store instruction is an instruction to store a half-word.

10. The method of claim 8, wherein the special store instruction is an instruction to store a word.

11. The method of claim 8, wherein the special store instruction is an instruction to store a double word.

12. The method of claim 6, further comprising:
- accessing the translation lookaside buffer to determine that the address of the store is not present; and
- updating the translation lookaside buffer to include the address.

13. The method of claim 6, further comprising:
- accessing the code lookaside buffer to determine that the address of the store is not present; and
- updating the code lookaside buffer to include the address.

14. A system for translating software in a first format into a second format, the system comprising:
- a memory containing the software in the first format;
- an emulator coupled to the memory configured to translate the software from the first format to the second format; and
- a host engine coupled to the emulator and configured to perform instructions in the second format;
- wherein the emulator is configured to speculatively use store commands in the first format, maintaining a table of such stores created and the destination addresses of such stores and convert them to special store commands in the second format in the event that subsequent execution branches to the location which is the destination of the store command with this replacement being performed before execution of the code at said destination location.

* * * * *